United States Patent [19]

Parker

[11]  4,171,694
[45]  Oct. 23, 1979

[54] TRIANGULAR DUCT SOLAR PANEL

[75] Inventor: Blaine F. Parker, Lexington, Ky.

[73] Assignee: University of Kentucky, Lexington, Ky.

[21] Appl. No.: 803,258

[22] Filed: Jun. 3, 1977

[51] Int. Cl.² .............................................. F24J 3/02
[52] U.S. Cl. ................................. 126/449; 237/1 A; 126/450
[58] Field of Search ............... 126/270, 271; 237/1 A; 34/93; 52/618; 165/171, 172, 48, 49

[56] References Cited

U.S. PATENT DOCUMENTS

| 3,937,208 | 2/1976 | Katz | 237/1 A |
| 4,013,062 | 3/1977 | Laird | 126/271 |
| 4,020,989 | 5/1977 | Kautz | 237/1 A |
| 4,054,246 | 10/1977 | Johnson | 237/1 A |

FOREIGN PATENT DOCUMENTS 276788  7/1967  Australia ..................... 126/270

*Primary Examiner*—Kenneth W. Sprague
*Assistant Examiner*—James C. Yeung
*Attorney, Agent, or Firm*—Birch, Stewart, Kolasch & Birch

[57] ABSTRACT

A solar panel suitable for panelized building construction as an integral part of a roof is described. The solar absorber plate of the panel consists of a thermally conductive sheet folded along a plurality of parallel lines to form sharp vees or corrugations. The folded solar absorber plate is attached to or formed as part of a flat sheet, also with high thermal conductivity. The folded absorber plate with its vee-shaped corrugations in combination with the flat sheet form a plurality of contiguous triangular ducts through which the fluid to be heated flows. The fluid is in direct contact with the solar absorber plate and the flat thermally conductive plate which together form the triangular ducts. A pliable insulating board may be provided as a backing member to the triangular duct assembly, said insulating board serves as an elastic mounting means for the solar panel on a building roof or wall. The triangular ducts may be oriented in an East-West direction to maximize the number of reflections of solar radiation between the ducts.

8 Claims, 4 Drawing Figures

TRIANGULAR DUCT SOLAR PANEL

BACKGROUND OF THE INVENTION

1. Field of the Invention

The present invention relates to a solar panel which may be used as a prefabricated module to form a solar collector as an integral part of a roof or wall in the construction of a building.

2. Description of Prior Art

A large number of solar collectors for heating liquids or gases have been developed. Specifically, the literature contains several references which are directly related to this invention. These are as follows:

1. Sparrow, E. M. and Lin, S. H. "Absorption of Thermal Radiation in A V-Groove Cavity". *Int. J. Heat Mass Transfer.* Vol. 5, pp. 1111–1115. Pergamon Press, 1962.

2. Hollands, K. G. T. "Directional Selectivity, Emittance, and Absorptance Properties of Vee Corrugated Specular Surfaces". *Solar Energy* 7: 108–116. 1963.

3. Trombe, F., Foex, M. and Vinh, M. Le Phat. "Studies on Selective Surfaces for Air-Conditioning Dwellings". *UN Conf. on New Sources of Energy,* V. 6, 1961.

4. Close, D. J. "Solar Air Heaters, For Low and Moderate Temperature Applications". *Journal of Solar Energy Science and Engineering,* Vol. VII, No. 3, pp. 117–124, July, 1963.

Each of the above references broadly teaches that a vee-corrugated surface, whether specular or difuse in nature, will provide an increased absorption of radiant energy. The increase in absorption applies both to direct beam solar radiation and to a lesser extent to difuse radiant energy. The Close publication presents computed data for solar heaters with air flow both under and over different types of absorber plates. The vee-corrugated plate, particularly with a selective coating, was superior in solar collection efficiency to all other forms of absorber plates discussed in Close.

The disclosures of each of the above references fail to recognize that the heat transfer efficiency of a vee-corrugated plate to a fluid to be heated can be further enhanced, if the vee-shaped bends in the absorber plate are closed by a conductive backing plate to form a plurality of contiguous triangular ducts.

For example, Close contemplates the use of a vee-corrugated absorber plate as illustrated in FIG. 2. However, this absorber plate is intended to take the place of the flat absorber plates in one of the arrangements illustrated in FIG. 2, which include absorber plates forming one side of a single large rectangular duct. Accordingly, the structure contemplated by Close would appear to be a large rectangular duct having one side containing a plurality of vee corrugations. Such a structure suffers from the disadvantage that the only heat transfer is from the two surfaces which define each vee on the side of the absorber plate in contact with the fluid being heated.

The above mentioned literature references also fail to provide a thin compact structural module which can be incorporated as an integral part of the roof construction of a building, said module forming the solar absorption and heat transfer functions of a solar collector.

Another prior art reference has used round and triangular shaped ducts as illustrated in U.S. Pat. Nos. 3,903,699 and 3,957,030 to Davis. However, the triangular ducts of Davis are not disposed adjacent to each other to form a flat solar collector plate which can be made an integral part of a sloped roof structure and oriented in an east-west direction for direct absorption of solar radiation. In each of the Davis Patents, an additional energy absorbing reflective surface is required to cause the solar radiation to enter the vee-corrugated surface at a favorable angle. In short, the Davis solar heaters are not designed for use as modular units to be incorporated as an integral part of a building construction and are totally unsuitable for such a use.

An additional prior art reference which appears to be quite pertinent at first blush is U.S. Pat. No. 2,998,006, issued Aug. 29, 1961 to Johnston. Johnston discloses spaced vees on an absorber plate as part of a solar fluid heater. However, the Johnston absorber plate suffers from at least two significant disadvantages. The vees are spaced on the side on which solar radiation is incident which arrangement prevents multiple reflections between the vees and the heat transfer to the fluid is only effected from the back side of the absorber plate. There is no thermally conductive backing attached to the back of the absorber plate of Johnston to enhance the transfer of heat to the fluid and the fluid flows in a large duct which is less effective in transferring heat to the transport fluid than the present invention.

Accordingly, although bits and pieces of some component portions of the novel construction of the present invention are recognized in the diverse type structures of the prior art, a need in the art exists for a highly efficient compact solar panel suitable for use in the modular construction of a solar collector formed as an integral part of the wall or roof of a building, which is not achieved by any of the prior art references discussed hereinbefore.

SUMMARY OF THE INVENTION

Accordingly, it is a primary object of the present invention to provide a solar panel which is suitable for manufacture on production lines and which can be installed as a construction component as an integral part of the roof of a building.

It is another object of the present invention to provide a solar panel which is oriented on the roof of the building in a predetermined direction which maximizes solar absorption due to multiple reflections within a vee-corrugated surface.

It is a further object of the present invention to combine with the solar absorption panel a means for increasing the heat transfer surface area to the transport fluid to be heated.

It is a further object of the present invention to provide for flow of the transport fluid in small ducts for the purpose of enhancing the heat transmission coefficient between the solid surface of the ducts and the transport fluid.

It is yet another object of the present invention to mount the solar absorber on a pliable insulating base which provides for expansion and contraction of the heat transfer surfaces and cushions the same with respect to the rest of the building structure.

The objects of the present invention are fulfilled by providing a solar panel including a solar absorber plate formed of a material which absorbs solar radiation and having corrugations therein defining a plurality of substantially parallel vee-shaped channels on the front and back surfaces of the absorber plate. Across the back of the absorber plate is a thermally conductive sheet disposed directly against the back thereof in heat conducting relationship therewith to close the vee-shaped channels to define a plurality of substantially triangular shaped ducts. The transport fluid to be heated is circulated through the triangular ducts and the fluid is heated by the transfer of heat from all three surfaces of the duct. Thus, the entire triangular surface of the ducts is a heat transfer surface for the fluid flowing therethrough.

If desired the fluid to be heated can flow both over the front surface of the vee-shaped absorber plate and through the triangular ducts, in order to further increase the heat transfer capability of the solar panel of the present invention.

To maximize the number of reflections between adjacent triangular ducts of solar radiation incident thereon the longitudinal dimensions of the ducts are disposed in a substantially east-west direction. Ideally, the vee-corrugations or triangular ducts are oriented horizontally on a roof sloped toward the south and the longitudinal dimensions of the corrugations or ducts run from east to west.

In a preferred embodiment, the solar plate and the backing sheet are mounted on a pliable insulating structural means, so that when it is installed on a rigid roof structure, the solar absorber portion of the panel may expand and contract without opposition from the rigid building construction.

BRIEF DESCRIPTION OF THE DRAWINGS

The objects of the present invention and the attendant advantages thereof will become more fully apparent by reference to the following drawings wherein.

DETAILED DESCRIPTION OF THE DRAWINGS

Figure 1:
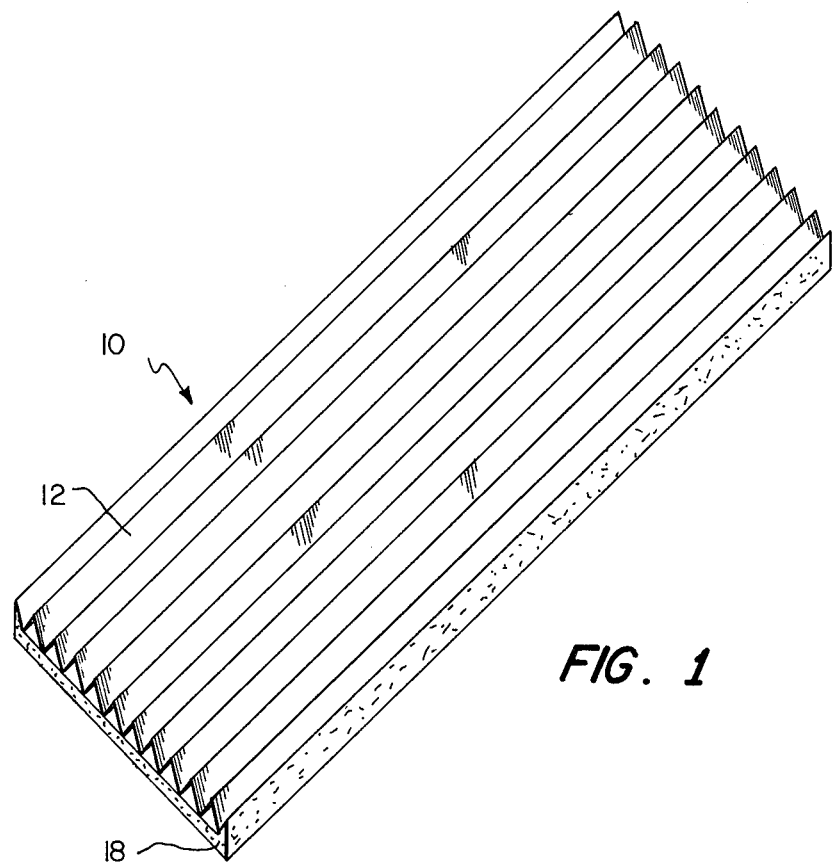
FIG. 1 is a perspective view illustrating the solar panel construction of the present invention.
Figure 2:
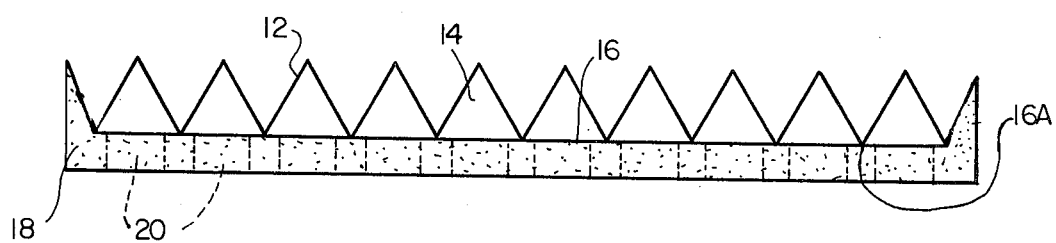
FIG. 2 is an end view of the solar panel illustrated in FIG. 1.

Referring in detail to FIGS. 1 and 2 of the drawings, there is generally indicated a solar panel 10 consisting of a vee-corrugated solar absorber plate 12 of a high conductivity bonded or connected by some other suitable means to a highly conductive flat sheet 16. Sheet 16 is disposed directly against the back of vee-corrugated solar absorber plate 12 and in combination with the vee-shaped corrugations on the back side of the absorber plate forms a plurality of contiguous triangular ducts 14 through which the fluid to be heated is circulated. If desired the vee-corrugated solar absorber plate 12 and the thermally conductive flat sheet 16 may be extruded as a single unit. If not extruded as a single unit, sheet 16 and absorber plate 12 should be coupled as illustrated at 16A and each point of contact between the two elements should be connected by a thermally conductive bond in such a manner that the flat sheet 16 becomes a heat conducting fin for transferring heat away from the absorber plate 12. In this manner, the entire triangle of triangular ducts 14 becomes an effective heat transfer surface for the fluid flowing in the triangular ducts.

An insulation board 18 is bonded to the back side of thermally conductive sheet 16 in order to decrease heat loss and thus further enhance the efficiency of the solar panel. In a preferred embodiment, the insulating board is fabricated from a pliable material which absorbs the movement of the remainder of the solar panel generated by the thermal expansion and contraction of the heat transfer surfaces of the solar panel. Thus, when the solar panel of the present invention is secured to the fixed rafters of the roof construction of a building, the heat transfer surfaces of a solar panel may move freely without damage to the seal between the rafters of the building and the base of the pliable insulating board.

FIGS. 1 and 2 clearly show the triangular ducts through which the air is forced. As an example, the use of 60° angles provides equilateral triangles and assuming that both the corrugated and the flat surface underneath are highly thermally conductive, all three surfaces of the triangle are effective in transferring heat to the air stream. An ordinary flat plate collector provides only one-third as much heat transfer surface area as the design of the present invention.

The solar panel of the present invention is particularly well suited for heating air since the heat transmission coefficient between a surface and a gas is exceedingly low compared to the heat transfer coefficient between a surface and liquids. However, it should be understood that the heating of gases other than air and liquids is also more efficiently performed by the solar panel construction of the present invention.

Figure 3:
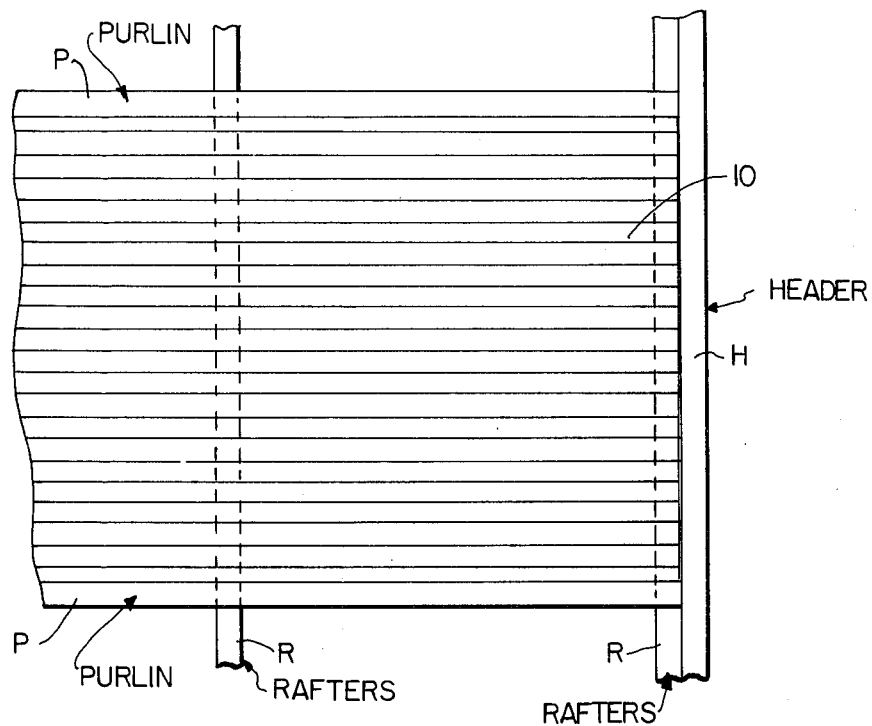
FIG. 3 is a top plan view of a roof section illustrating the manner in which the solar panel of the present invention is installed as an integral part of the roof.
Figure 4:
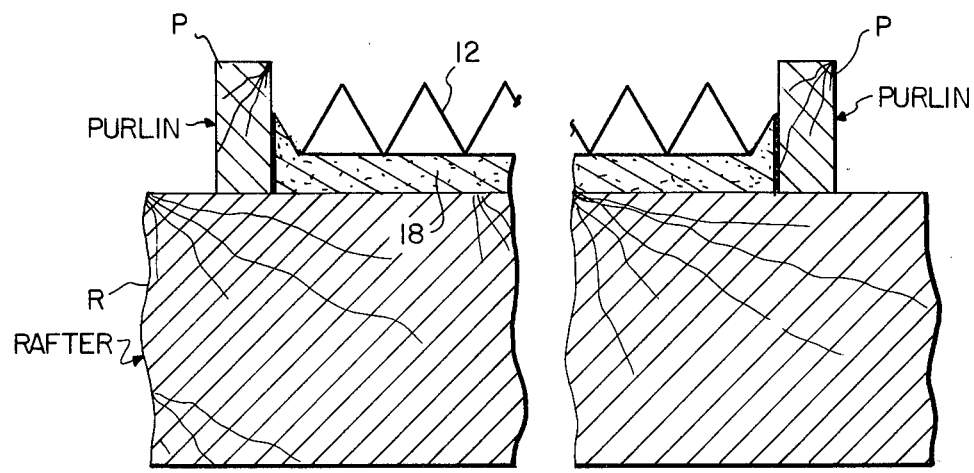
FIG. 4 is a cross-sectional view taken along lines 4—4 of FIG. 3.

Generally the solar panels of the present invention would be made from two to four feet wide and twelve or more feet in length and applied by glue or other sealing means directly to the rafters R of a roof section of a building as indicated in FIGS. 3 and 4. However, the panel may be mounted on the roof sheathing or on the outside wall of a building.

Referring in more detail to FIGS. 3 and 4, there is illustrated a section of a roof of a building, one edge being defined by a header H, and including a plurality of parallel rafters R which extend vertically up the slope of the roof and a plurality of cross braces or purlins P. As illustrated, the solar panel construction of the present invention is adapted to fit in between the purlins P and may be directly fastened to the rafters R by glue or other suitable adhesive means to the rafters. The glue is applied to the underside of the insulating board 18 and the front surface of the vee-corrugated solar absorber plate 12 is left exposed to incident solar radiation. As discussed hereinbefore, the ideal orientation of the roof section is toward the south while the ideal orientation of the longitudinal dimensions of the triangular ducts formed by the vee-corrugations of solar absorber plate 12 is in an East-West direction. In this direction, incident solar radiation upon solar absorber plate 12 is absorbed on the first impact or reflected back and forth between adjacent triangular ducts, thus increasing total absorption and therefore maximizing the conversion of solar energy to heat on the solar absorber plate 12.

As illustrated in FIG. 4, the edges of insulating board 18 are also secured by suitable adhesive means to the abutting surfaces of purlins P.

The solar panel of the present invention has been designed to function as an integral part of the roof of a building utilizing a fan to circulate supply air to two locations on the roof where the air is conducted between two rafters which form a duct between them. It is necessary to thoroughly seal this air duct on both the bottom and top of the rafters. The top seal is created by the solar panel in the manner illustrated in FIGS. 3 and 4, such as by utilizing a high grade caulk such as silicone rubber between the panel, purlins P and rafters R. The bottom seal would be provided by a solid panel (not shown) sealed to the bottom of rafters R. The air is then forced into the duct formed between the rafters and flows through the holes 20 (see FIG. 1) manufactured into the bottom of solar panel 10 into the long triangular ducts 14 where the air is heated by the entire triangular surface. The air flows through similar holes 20 cut in the bottom of the solar panel at the opposite end into one or more ducts formed between the rafter spaces and form there into the ducts which supply hot air to the building or to a crushed rock bed. If only one-half of the horizontal length was desired for a solar collector area, then only two ducts would need to be connected to the roof of the building. During the summer, suitable vent means may be provided to allow natural convection to cool the collector.

It should be understood that the solar panel of the present invention could be used for other purposes than forming a solar collector for a building. For example, the solar panel could be used in a system for drying grain or other material. In this arrangement, the ends of the triangular ducts might be opened to the atmosphere in such a manner that air would be introduced both across the top of solar absorber plate 12 and through ducts 14. In this manner, approximately twice the air flow would result while maintaining the same pressure drop across the collector.

In a preferred embodiment, the solar absorber panel is constructed of aluminum with a specular selective surface exposed to solar radiation in order that incident radiation which is not absorbed on the first impact will be reflected specurarily resulting in mirror like regular reflectance of that energy which is not absorbed on the first impact and therefore resulting in multiple reflections between the surfaces of the triangular ducts, thereby increasing total absorptivity. The selective surface will minimize long wave length radiation from the solar absorber plate. Also in a preferred embodiment, the insulating board would provide some structural strength to the solar panel. A dense fiberglass board which has been manufactured with a high temperature adhesive would be suitable for this purpose as well as provide the elasticity for fastening the solar panel to the rigid structural frame of the building.

It should be understood that the solar panel of the present invention may be modified as it would occur to one of ordinary skill in the art without departing from the spirit and scope of the present invention.

It is claimed:

1. A solar panel comprising:
   an absorber plate formed of a material which absorbs solar radiation, said absorber plate being corrugated to define a plurality of substantially parallel vee-shaped channels on the front and back surface of said absorber plate;
   a thermally conductive sheet disposed directly against the back of said absorber plate and thermally bonded thereto to close the vee-shaped channels on said back surface to define a plurality of substantially triangular ducts for transporting a fluid to be heated; and
   insulation means disposed adjacent to the surface of said thermally conductive sheet opposite from the surface of said sheet which is against said absorber plate, said insulation means being sufficiently rigid to provide the sole means of support of said absorber plate and thermally conductive sheet and providing thermal isolation of said absorber plate and thermally conductive sheet along at least two opposite edges of said panel parallel to said vee-shaped channels, said insulation means along said at least two edges having only heat insulating material on the surfaces thereof contiguous to said surrounding environment.

2. The solar panel of claim 1, wherein said insulation means is a pliable insulating board for absorbing thermal expansion and contraction of said absorber plate and said thermally conductive sheet.

3. The solar panel of claim 1, including inlet and outlet means for permitting the flow of a fluid to be heated through the triangular ducts of said solar panel.

4. A solar collector heating system for a building formed as an integral part of the roof of said building comprising:
   a sloped roof section of said building including a plurality of rafters and having a predetermined orientation with respect to incident solar radiation;
   solar panel means installed in said roof section as an integral part thereof, said solar panel means including an absorber plate formed of a material which absorbs solar radiation, said absorber plate being corrugated to define a plurality of substantially parallel vee-shaped channels on the front and back surface of said absorber plate, and a thermally conductive sheet disposed directly against the back of said absorber plate and thermally bonded thereto to close the vee-shaped channels on said back surface to define a plurality of substantially triangular ducts for transporting a fluid to be heated;
   means for circulating a fluid to be heated through said triangular ducts; and
   insulation means disposed adjacent to the surface of said thermally conductive sheet opposite from the surface of said sheet which is against said absorber plate, said insulation means being sufficiently rigid to provide the sole means of support of said absorber plate and thermally conductive sheet and providing thermal isolation of said absorber plate and thermally conductive sheet along at least two opposite edges of said panel parallel to said vee-shaped channels, said insulation means along said at least two edges having only heat insulating material on the surfaces thereof contiguous to said surrounding environment.

5. The solar heating system of claim 4, wherein said solar panel means comprises a plurality of modular panels secured to the rafters of said roof, the triangular ducts of each of said panels being fluidly interconnected to each other and said means for circulating said fluid to be heated through manifolds formed between adjacent rafters of said roof one manifold being positioned at an entry to said triangular ducts and one manifold being positioned at an exit for said triangular ducts.

6. The solar heating system of claim 4, further comprising insulating means adjacent to the surface of said flat thermally conductive sheet opposite from the surface of said sheet which is against said solar absorber panel.

7. The solar heating system of claim 6, wherein said insulation means is a pliable insulating board for absorbing thermal expansion and contraction of said absorber plate and said flat thermally conductive sheet.

8. A solar collector heating system for a building formed as an integral part of a structural section of said building, said structural section of said building including a plurality of parallel space support members and having a predetermined orientation with respect to incident solar radiation, comprising:

a plurality of modular solar panels installed in said structural section and secured to the parallel support members of said section as an integral part thereof, said solar panel means including an absorber plate formed of a material which absorbs solar radiation, said absorber plate being corrugated to define a plurality of substantially parallel vee-shaped channels on the front and back surface of said absorber plate, and a thermally conductive sheet disposed directly against the back of said absorber plate and thermally bonded thereto to close the vee-shaped channels on said back surface to define a plurality of substantially triangular ducts for transporting a fluid to be heated;

said triangular ducts of each of said panels being fluidly interconnected to each other through a manifold formed between two adjacent support members of said section, one manifold being positioned at an entry to said triangular ducts and one manifold being positioned at an exit for said triangular ducts;

insulating means including a first surface which is secured to the surface of said flat thermally conductive sheet opposite from the surface of said sheet which is against said solar absorber panel, said insulating means including a second surface which is secured to the support members of said section, said insulating means being a pliable insulating board of absorbing thermal expansion and contraction of said absorber plate and said flat thermally conductive sheet so that substantially no forces are transmitted to said support members, said insulation means being sufficiently rigid to provide the sole means of support of said absorber plate and thermally conductive sheet and providing thermal isolation of said absorber plate and thermally conductive sheet along at least two opposite edges of said panel parallel to said vee-shaped channels, said insulation means along said at least two edges having only heat insulating material on the surfaces thereof contiguous to said surrounding environment; and means for circulating a fluid to be heated through said triangular ducts.

* * * * *